United States Patent
Ohta et al.

(10) Patent No.: US 7,804,495 B2
(45) Date of Patent: Sep. 28, 2010

(54) USER INTERFACE SYSTEM, USER INTERFACE APPARATUS, AND METHOD OF CONTROLLING ELECTRONIC DEVICE

(75) Inventors: Tomoko Ohta, Tsurugashima (JP); Hiroshi Nakamura, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 742 days.

(21) Appl. No.: 11/793,650

(22) PCT Filed: Nov. 2, 2005

(86) PCT No.: PCT/JP2005/020179

§ 371 (c)(1),
(2), (4) Date: Jun. 21, 2007

(87) PCT Pub. No.: WO2006/070531

PCT Pub. Date: Jul. 6, 2006

(65) Prior Publication Data

US 2008/0018594 A1      Jan. 24, 2008

(30) Foreign Application Priority Data

Dec. 27, 2004   (JP)   ............................. 2004-377267

(51) Int. Cl.
*G09G 5/00* (2006.01)
(52) U.S. Cl. ........................ 345/184; 345/156; 345/169; 345/173; 178/18.01; 178/18.03
(58) Field of Classification Search .................. 345/156, 345/173, 174, 169, 184; 178/18.01, 18.03
See application file for complete search history.

(56) References Cited

U.S. PATENT DOCUMENTS

| | | | | |
|---|---|---|---|---|
| 2003/0095096 | A1* | 5/2003 | Robbin et al. | ................ 345/156 |
| 2005/0140657 | A1* | 6/2005 | Park et al. | .................... 345/169 |
| 2006/0028454 | A1* | 2/2006 | Branton et al. | .............. 345/173 |
| 2006/0187216 | A1* | 8/2006 | Trent et al. | ................... 345/173 |

FOREIGN PATENT DOCUMENTS

| | | |
|---|---|---|
| JP | 3-103912 | 4/1991 |
| JP | 09-091109 | 4/1997 |
| JP | 2001-154766 | 6/2001 |
| JP | 2004-355606 | 12/2004 |

\* cited by examiner

*Primary Examiner*—Amare Mengistu
*Assistant Examiner*—Koosha Sharifi
(74) *Attorney, Agent, or Firm*—Drinker Biddle & Reath LLP

(57) ABSTRACT

The present invention provides a user interface apparatus capable of determining both control content and a control amount without increasing the number of buttons.

A remote controller RC is provided with a ring pad 121 as a ring-shaped operating element. The total range of the ring pad 121 is divided into a predetermined number of regions, and control content and a region number are defined for each of the regions. In the case of controlling a DVD/HD recorder DHR by using the remote controller RC, control content is specified on the basis of a region in the ring pad 121 touched by the user for the first time. In the case where the user performs an input operation of continuously tracing the ring pad 121, a control of a control amount according to the number of regions traced by the operation is performed.

13 Claims, 5 Drawing Sheets

USER INTERFACE SYSTEM, USER INTERFACE APPARATUS, AND METHOD OF CONTROLLING ELECTRONIC DEVICE

TECHNICAL FIELD

The present invention relates to a technique for controlling an electronic device to be controlled and, more particularly, to a technique of a user interface apparatus used for an electronic device.

BACKGROUND ART

In recent years, to improve usability of the user, electronic devices such as a DVD/HD (Hard Disk) recorder and a television receiver are achieving more and more functions. As the functionality is becoming greater, the number of buttons disposed on a remote controller and an operation panel is increasing under the present circumstances. Although the functions are being improved to assure usability of the user, such present circumstances exert an adverse effect of deteriorating the operability of the user. In consideration of the present circumstances, like an input device described in Japanese Unexamined Patent Publication (JP-A) No. 2001-154766, an electronic device is proposed, which specifies a control of reproduction, pause, or the like in accordance with input data of the user on a touch panel and performs a control corresponding to the data without providing a plurality of buttons.

DISCLOSURE OF THE INVENTION

Problem to be Solved by the Invention

In the case of actually controlling an electronic device, for example, in many cases, there is necessity to designate a control amount such as the case of adjusting a volume or playback speed. However, in the case of the electronic device described in JP-A No. 2001-154766, the control content can be designated on the basis of an input operation on a touch panel, but the control amount cannot be designated.

The present invention has been achieved in view of the above-described circumstances, and an object of the invention is to provide a user interface system, a user interface apparatus, and a method of controlling an electronic device, capable of designating both of control content and a control amount without increasing the number of buttons.

Means for Solving the Problem

In order to solve the problem, in one aspect of the present invention, the invention according to claim 1 relates to a user interface system for controlling an electronic device in any of a plurality of pieces of predetermined control content on the basis of an input operation of the user, comprising:

an operating device having an operation screen for accepting an input operation of the user by a touch;

a position detecting device which detects a user touch position in the operation screen;

a position change detecting device which detects a change in the touch position in the case where the user changes the touch position while maintaining the touch state with the operating means device; and a control device which determines the control content on the basis of the touch position in the operation screen and, when the touch position changes, controls the electronic device with the control content on the basis of a control amount according to an amount of the change in the touch position, wherein in the case where the control amount is a function of the present value of the control content, the control device changes the control amount according to the change amount in such a way that a shape of graph indicative of the function becomes to a smoothly-staircase-like, and monotonously increased shape in the case where the present value is indicated by a horizontal axis, and the control amount is indicated by a vertical axis.

In order to solve the problem, in another aspect of the present invention, the invention according to claim 10 relates to a user interface system for outputting a control signal for controlling an electronic device in any of a plurality of pieces of predetermined control content on the basis of an input operation of the user, comprising:

an operating device having an operation screen for accepting an input operation of the user by a touch;

a position detecting device which detects a user touch position in the operation screen;

a position change detecting device which detects a change in the touch position in the case where the user changes the touch position while maintaining the touch state with the operating means device; and an output device which outputs a control signal corresponding to a control amount based on the touch position, and a change amount of the change in the touch position detected by the position change detecting device, wherein in the case where the control amount is a function of the present value of the control content, the output device changes the control amount according to the change amount in such a way that a shape of graph indicative of the function becomes to a smoothly-staircase-like, and monotonously increased shape in the case where the present value is indicated by a horizontal axis, and the control amount is indicated by a vertical axis, and the output device outputs a control signal corresponding to the changed control amount.

In order to solve the problem, in still another aspect of the present invention, the invention according to claim 11 relates to an electronic device controlling method of controlling an electronic device in any of a plurality of pieces of predetermined control content on the basis of an input operation of the user, comprising:

a first process of detecting a touch position of a user in an operating element having an operation screen for accepting an input operation of the user by a touch;

a second process of detecting a change in the touch position in the case where the user changes the touch position while maintaining the touch state with the operating element; and a third process of determining the control content on the basis of the touch position in the operating element and, when the touch position changes, controlling the electronic device with the control content on the basis of a control amount according to an amount of the change in the touch position, wherein the third process is a process of, in the case where the control amount is a function of the present value of the control content, changing the control amount according to the change amount in such a way that a shape of graph indicative of the function becomes to a smoothly-staircase-like, and monotonously increased shape in the case where the present value is indicated by a horizontal axis, and the control amount is indicated by a vertical axis.

DESCRIPTION OF REFERENCE NUMERALS

Figure 1:
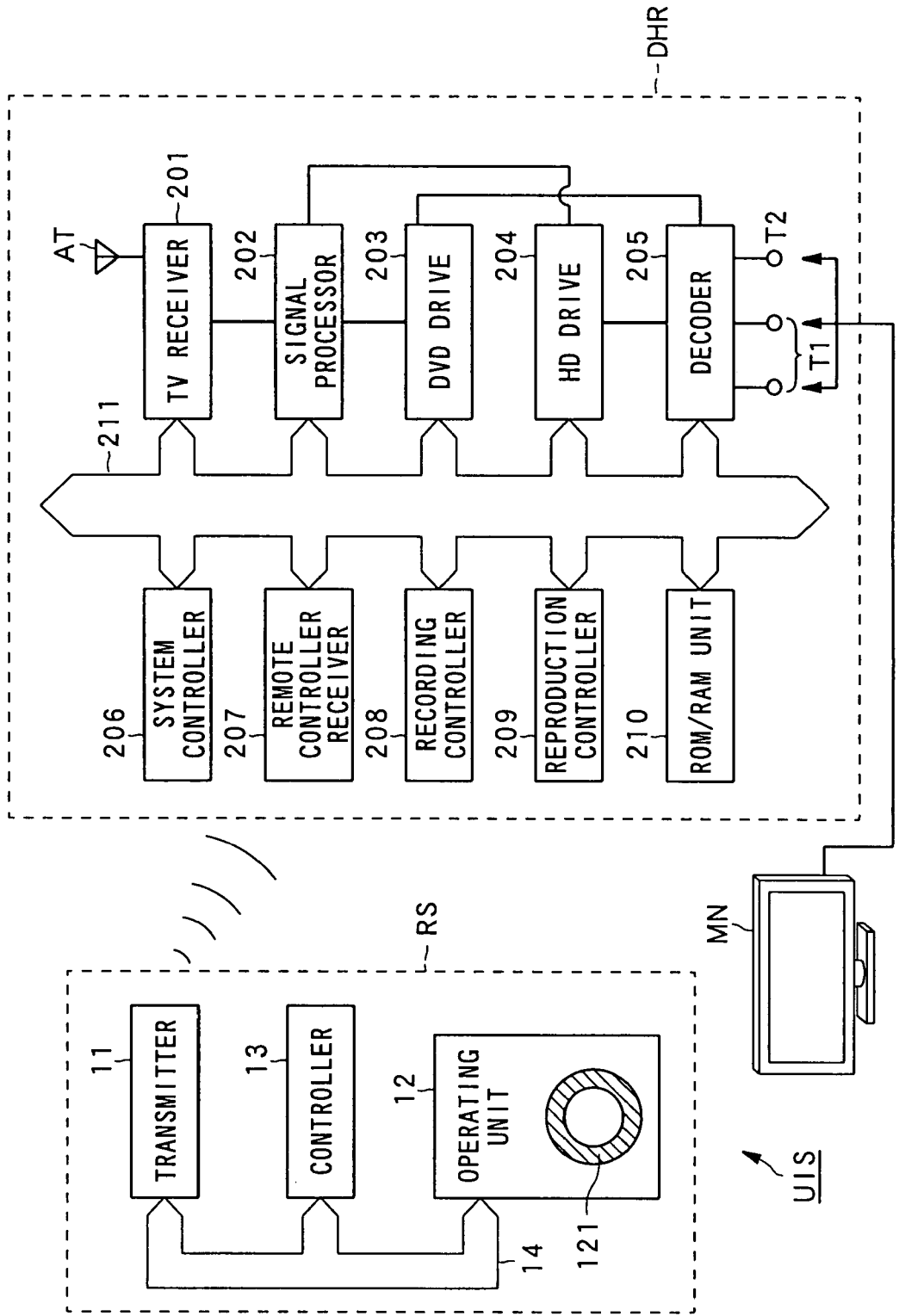
FIG. 1 is a block diagram showing the configuration of a user I/F system UIS in a first embodiment.

UIS User I/F system
RC Remote controller
11 Transmitter
12 Operating unit
121 Ring pad
13 Controller
14 System controller
DHR DVD/HD recorder
201 TV receiver
202 Signal processor
203 DVD drive
204 HD drive
205 Decoder
206 System controller
207 Remote controller receiver
208 Recording controller
209 Reproduction controller
210 ROM/RAM unit
211 System bus

BEST MODE FOR CARRYING OUT THE INVENTION

1. First Embodiment

1.1 Configuration of First Embodiment (1) Outline of User Interface System

First, a user interface (hereinbelow, I/F) system UIS will be described with reference to FIG. 1 showing the configuration of the user I/F system UIS of the embodiment. In the following embodiment, the user interface (hereinbelow, I/F) device of the invention is applied to the control of a DVD/HD (hard disk) recorder DHR.

First, as shown in the diagram, the user I/F system UIS of the embodiment has, for example, a remote controller RC, the DVD/HD recorder DHR as an electronic device to be operated, and a monitor MN connected to the DVD/HD recorder DHR. A control corresponding to an input operation performed on the remote controller RC by the user is executed in the DVD/HD recorder DHR.

As a characteristic matter in the embodiment, the remote controller RC is provided with a ring pad 121 as a ring-shaped operating element (for example, a touch pad). According to an input operation performed on the ring pad 121 by the user, various controls are executed in the DVD/HD recorder DHR.

To realize such a function, in the embodiment, the total range of the ring pad 121 is divided into a plurality of regions, and a plurality of pieces of control content (for example, volume adjustment and playback speed adjustment) are defined for each of the regions. In the case where the user touches and presses (hereinbelow, simply called touches) a predetermined region in the ring pad 121 with a part of his/her body such as a finger (hereinbelow, called "finger"), control content is specified on the basis of the touched region, and a control corresponding to the content is executed. A "region" in the following description refers to a region in the ring pad 121.

In some of the controls in an electronic device (the DVD/HD recorder DHR in the embodiment), it is often necessary to designate not only the control content but also a control amount like in the case of scrolling a screen or in the case of adjusting volume. The embodiment employs a method of continuously moving a finger along the ring pad 121 by the user and designating a control amount on the basis of the number of touched regions (that is, the number of regions touched from beginning until the finger is moved off from the ring pad 121). In the embodiment, "continuously moving" denotes an operation of moving a finger in the circumferential direction of the ring pad 121 and touching a plurality of regions without moving the finger off from the ring pad 121 (that is, while maintaining the touch state).

Concrete configurations of devices realizing the function will be described hereinbelow.

(2) Concrete Configuration of Remote Controller RC

First, the remote controller RC is an apparatus for receiving an input operation of the user and transmitting a signal corresponding to the input operation to the DVD/HD recorder DHR. In the embodiment, for example, the remote controller RC has a transmitter 11, an operating unit 12, a controller 13, and a data bus 14 connecting the elements.

The transmitter 11 has a light emission diode and transmits data entered via the data bus 14 by infrared light to the DVD/HD recorder DHR under control of the controller 12.

The operating unit 12 has various buttons and cursor keys disposed on a casing of the remote controller RC and outputs an input signal corresponding to an input operation of the user to the controller 13. As a characteristic matter in the embodiment, the operating unit 12 is provided with the above-described ring pad 121. The user touches the ring pad 121 with his/her finger, thereby performing various input operations. The ring pad 121 may be constructed by any device. Examples of the device are: (a) a touch pad of a type of detecting a touch of the user on the basis of electrostatic capacitance, (b) a touch pad of a type of detecting a touch of the user by making a resistance value change in accordance with the position of the touch of the user, and (c) a touch pad in which a plurality of buttons whose stroke is close to "0".

Figure 2:
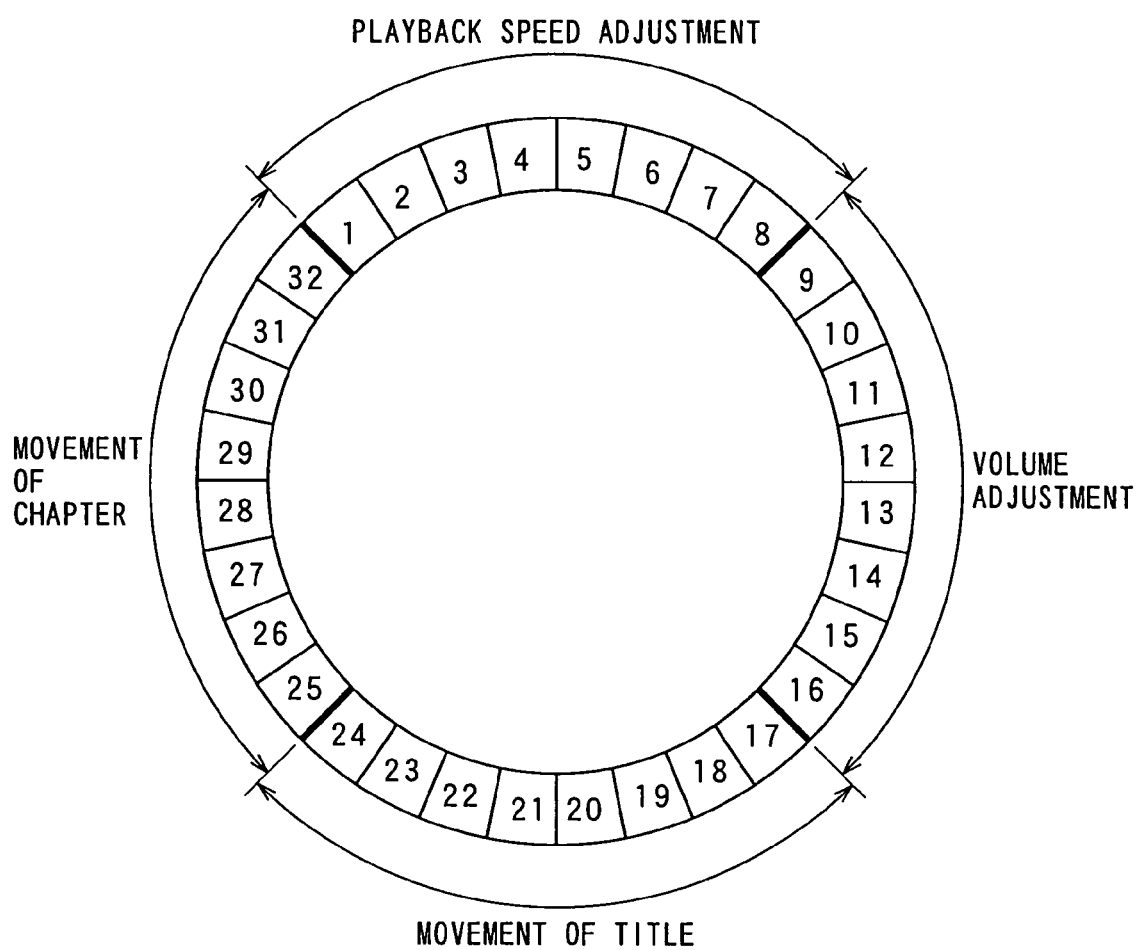
FIG. 2 is a diagram illustrating a corresponding relation between each of positions on a touch pad 121 provided for a remote controller RC in the embodiment and control content.

The ring pad 121 will be described in more detail with reference to FIG. 2. FIG. 2 is a diagram illustrating the corresponding relation between each of the positions on the touch pad 121 and control content.

As shown in the diagram, the whole circumference of the touch pad 121 of the embodiment is divided into a plurality of regions (32 regions in the case of FIG. 2), and the region number indicative of each of the regions and control content are defined so as to be associated with each other on the region unit basis. For example, in the case of the example of FIG. 2, the regions of Nos. "1" to "8" are defined as the control content of "adjustment of playback speed", the regions of Nos. "9" to "16" are defined as the control content of "volume adjustment", the regions of Nos. "17" to "24" are defined as the control content of "movement of title", and the regions of Nos. "25" to "32" are defined as the control content of "movement of chapter".

The controller 13 controls the components of the remote controller RC mainly constructed by a CPU (Central Processing Unit). The controller 13 has a memory such as ROM (Read Only Memory) in which remote control information for remote-controlling the DVD/HD recorder DHR is recorded. On the basis of the remote control information, the controller 13 transmits a control signal corresponding to an input operation performed on the operating unit 12 by the user to the DVD/HD recorder DHR via the transmitter 11.

Concretely, when the user depresses a predetermined button in the operating unit 12, the controller 13 transmits a control signal to the DVD/HD recorder DHR on the basis of the remote control information.

When the user touches the ring pad 121 with his/her finger, the controller 13 specifies the touched region and, after that, transmits a control signal indicative of the region number of the region to the DVD/HD recorder DHR on the basis of the remote control information. For example, when the user touches the region of No. 10 in the example shown in FIG. 2, the controller 13 transmits the control signal indicative of the region No. "10" of the region to the DVD/HD recorder DHR. As a result, in the DVD/HD recorder HDR, the control content designated by the user is specified as "volume adjustment" on the basis of the control signal.

Further, when the user moves the ring pad 121 with his/her finger continuously and a change occurs in the region touched with the finger, the controller 13 sequentially transmits the control signal indicative of the region number of the region touched with the user to the DVD/HD recorder DHR. In such a manner, the continuous movement of a finger of the user along the ring pad 121 is detected by the DVD/HD recorder DHR on the basis of the control signal sent from the remote controller RC, and a control of a predetermined amount is performed by, for example, gradually changing the volume level.

A handling performed when a finger of the user touches a plurality of regions is optionally determined. For example, in such a case, the touch is processed as an error and a control signal is not transmitted. The region number of a region touched with a finger of the user for the first after that may be output as a control signal. A control indicative of the region number of a region touched with a finger of the user most among the plurality of regions may be output. Further, it is also possible to preliminarily determine priorities and output a control signal indicative of the region number of a region having the highest priority.

(3) Concrete Configuration of DVD/HD Recorder HR

Next, a concrete configuration of the DVD/HD recorder DHR will be described.

First, as shown in FIG. 1, the DVD/HD recorder DHR of the embodiment has, for example, a TV receiver 201, a signal processor 202, a DVD drive 203, an HD drive 204, a decoder 205, a system controller 206, a remote controller receiver 207, a recording controller 208, a reproduction controller 209, a ROM/RAM unit 210, and a system bus 211 connecting the elements, and realizes recording and reproduction of data to/from a DVD loaded in the DVD drive 203 and recording and reproduction of data to/from an HD loaded in the HD drive 204.

In the embodiment, the DVD/HD recorder DHR executes a process corresponding to a control signal sent from the remote controller RC. Particularly, when a control signal sent from the remote controller RC indicates the region number in the ring pad 121, a control corresponding to the region number is performed in the DVD/HD recorder DHR.

The elements of the DVD/HD recorder DHR having such a function will be described hereinbelow.

First, the TV receiver 201 receives broadcast waves transmitted from broadcast stations via an antenna AT, for example, an RF signal of the VHF (Very High Frequency) broadcast, and converts a broadcast wave received in tune with the reception band selected by the user to an IF (Intermediate Frequency) signal. The TV receiver 201 demodulates the converted IF signal to a video signal and a sound signal for TV (that is, TV signals) and outputs the demodulated signals to the signal processor 202.

Under control of the recording controller 208, the signal processor 202 performs a predetermined process such as conversion to a signal in a predetermined format or A/D conversion on the TV signal supplied from the TV receiver 201, thereby converting the TV signal to digital data (that is, content data) in a predetermined format. The signal processor 202 encodes the digital data obtained by the conversion, for example, in the MPEG (Moving Picture Coding Experts Group) format, generates a program stream on the basis of the encoded content data, and supplies the generated program stream to the DVD drive 203 or the HD drive 204.

The DVD drive 203 has a DVD-removable configuration, includes a DVD drive interface conformed with a standard such as ATAPI (ATAttachment Packet Interface), and records/reproduces data to/from a loaded DVD. The HD drive 204 has an HD drive interface confirmed with a standard such as ATAPI and records/reproduces data to/from a HD.

To the decoder 205, content data in the program stream format read from the DVD or HD is input at the time of reproducing the content data recorded on the DVD or HD. The decoder 205 separates the input program stream into sound data and video data and decodes the data under control of the reproduction controller 209. The decoder 205 converts the decoded content data into a signal in the NTSC format, and outputs the converted video signal to the monitor MN via a video signal output terminal T1 and a sound signal output terminal T2.

The remote controller receiver 207 receives, for example, a control signal transmitted from the remote controller RC by infrared light and outputs the received control signal to the system controller 206.

Subsequently, the recording controller 208 controls recording of content data on a DVD or HD under control of the system controller 206, and the reproduction controller 209 controls reproduction of content data recorded on a DVD or HD under control of the system controller 206.

The system controller 206 is constructed mainly by a CPU, includes various input/output ports such as a key input port, and controls the general function of the DVD/HD recorder DHR in a centralized manner. For the control, the system controller 206 uses control information recorded in the ROM/RAM unit 210, and uses the ROM/RAM unit 210 as a work area.

For example, the system controller 206 controls the recording controller 208 and the reproduction controller 209 on the basis of a control signal sent from the remote controller RC to record/reproduce data to/from a DVD or HD.

In the case where the control signal transmitted from the remote controller RC indicates a region number on the ring pad 121, the system controller 206 specifies control content on the basis of the region number indicated by the control signal, and shifts to a mode of performing a control corresponding to the control content (hereinbelow, called "control mode").

Further, when the region number transmitted from the remote controller RC changes under a predetermined control mode (for example, a mode for adjusting volume), the system controller 206 performs a control of increasing/decreasing the volume level in accordance with the change. As a result, when the user continuously traces the ring pad 121 with his/her finger, for example, the volume level is increased/decreased only by a control amount corresponding to the number of regions traced. The details of the process will be described later in the paragraph of operation.

Further, when movement of the finger of the user off from the ring pad 121 is detected in the remote controller RC under a predetermined control mode, the system controller 206 finishes the control in the control mode.

Any method is used for determining whether or not a finger is moved off from the ring pad 121 by the system controller 206. In the embodiment, determination by the following method will be described. A control signal indicative of the region number of the region touched by the user is output in predetermined cycles (for example, every 30 msec) from the remote controller RC not only in the case where the region touched by a finger changes due to movement of the finger of the user but also in the case where the touch with the ring pad 121 continues due to no movement of the finger of the user. When a control signal is not transmitted from the remote controller RC for the cycle or longer, movement of the finger off from the ring pad 121 is determined.

1.2 Operation of First Embodiment

The operation of the user I/F system UIS of the embodiment will be described hereinbelow. In the following, concretely, the case of controlling the DVD/HD recorder DHR by using the remote controller RC and using the control content associated with each of the regions in the ring pad 121 in the remote controller RC as shown in FIG. 2 will be described as an example.

First, the user operates a not-shown operation panel of the DVD/HD recorder DHR to turn on the power supply of the DVD/HD recorder DHR. When the user touches the ring pad 121 of the remote controller RC in this state, the controller 13 of the remote controller RC transmits a control signal indicative of the region number corresponding to the region touched by the user to the DVD/HD recorder DHR via the transmitter 11.

Figure 3:
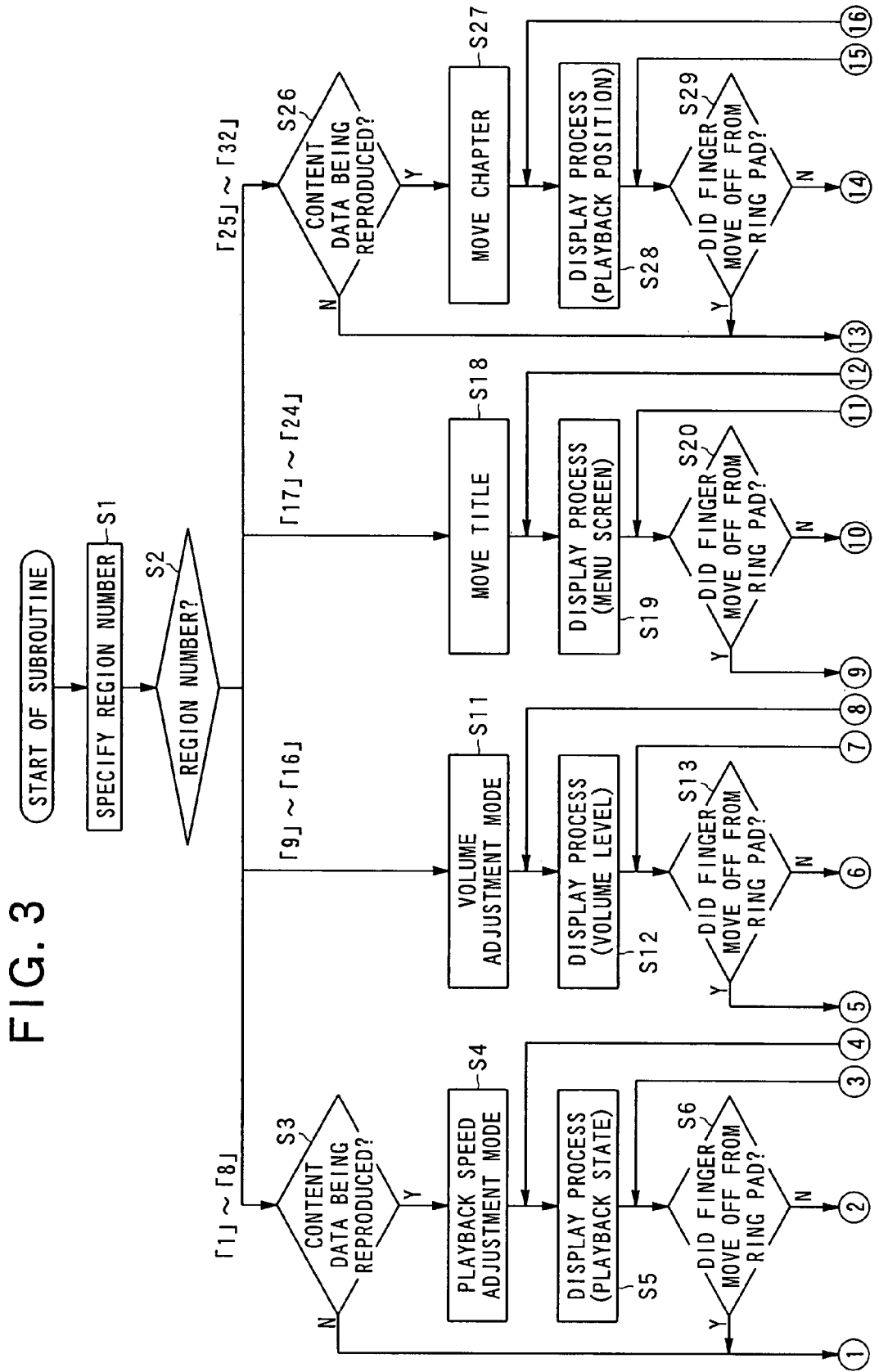
FIG. 3 is a flowchart showing processes executed by a system controller 206 of a DVD/HD recorder DHR in the embodiment.
Figure 4:
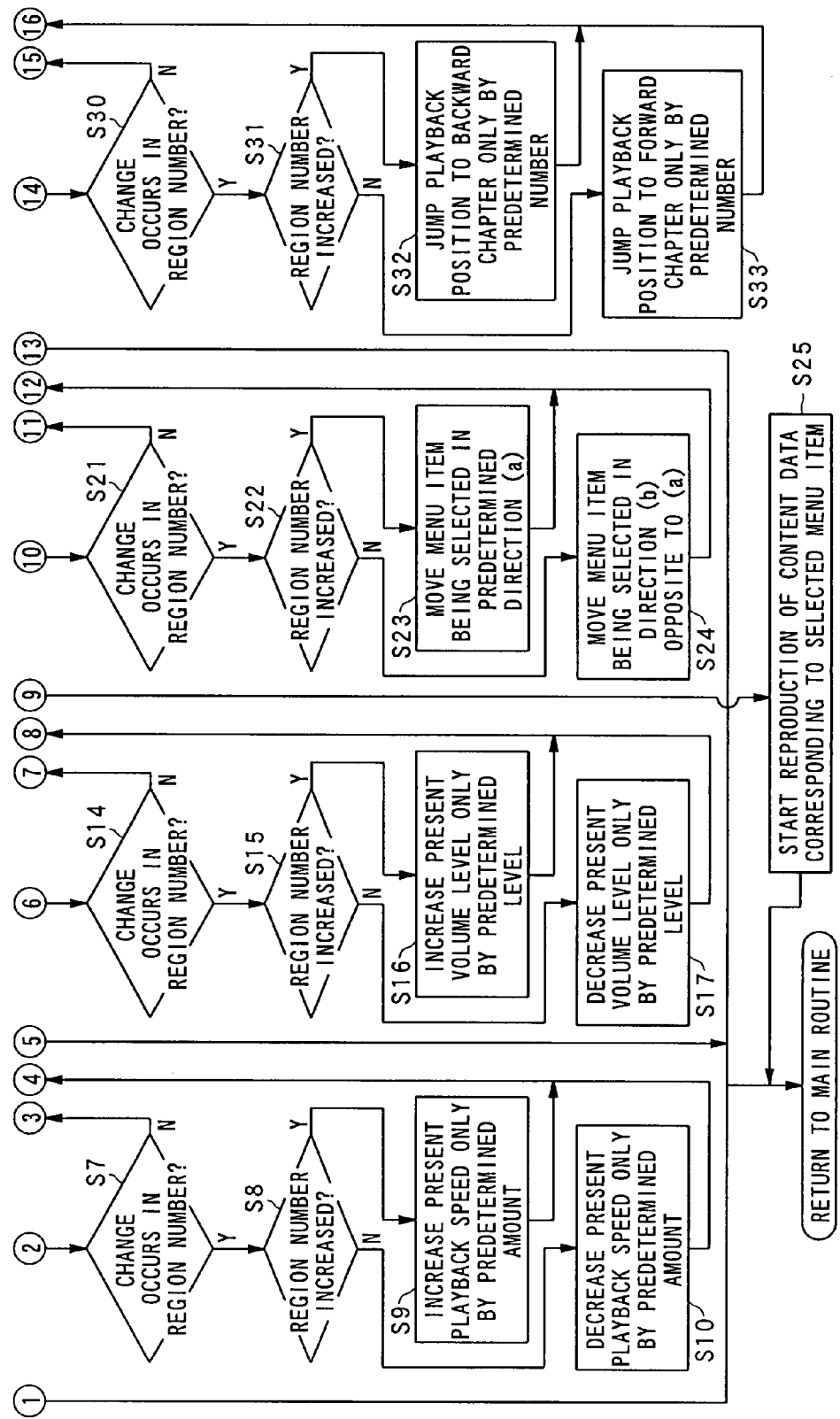
FIG. 4 is a flowchart showing processes executed by the system controller 206 of the DVD/HD recorder DHR in the embodiment.

When the control signal is transmitted from the remote controller RC and received by the remote controller receiver 207 in the DVD/HD recorder DHR, in the system controller 206, processes shown in FIGS. 3 and 4 are executed by using reception of the control signal as a trigger. FIGS. 3 and 4 are flowcharts showing processes executed by the system controller 206 when a control signal indicative of a region number is transmitted from the remote controller RC. The processes are performed in subroutines of the main routine executed by the system controller 206.

In the processes, first, the system controller 206 specifies the region number on the basis of the control signal (step S1) and determines the range of "1" to "8", "9" to "16", "17" to "24", or "25" to "32" to which the specified region number belongs (step S2). According to the determination result, the system controller 206 executes the following process to realize each of the control content.

In the Case where Region Number is in the Range of "1" to "8" (Playback Speed Adjustment)

In the case where the region number specified in step S1 lies in the range from "1" to "8", the system controller 206 determines whether content data is being reproduced or not (step S3). When "No" in the determination, the system controller 206 returns to the main routine. When "Yes" in the determination, the system controller 206 shifts to a mode for adjusting the playback speed (step S4). In the case of shifting to the mode, first, the system controller 206 stores the playback speed at present into the ROM/RAM unit 210, generates image data indicative of the playback speed, and supplies the image data to the decoder 205 (step S5). As a result, information of the playback speed at present and the like is displayed on the monitor MN. After that, the system controller 206 enters a state of determining whether the user moves the finger off from the ring pad 121 or not (step S6). When it is determined that the finger is moved off ("yes"), the system controller 206 returns to the main routine.

On the other hand, when it is determined as "no" in step S6, the system controller 206 determines whether the region number indicated by the control signal transmitted from the remote controller RC has changed or not (step S7). For example, in the case where the finger of the user remains in touch with the ring pad 121, the control signal indicative of the same region number is sent in predetermined cycles from the remote controller RC. In this case, the system controller 206 determines as "no" in step S7 and returns to the process of step S6.

For example, when the user traces the ring pad 121 with his/her finger, a change occurs in the region number indicated by the control signal transmitted from the remote controller RC. In such a case, the system controller 206 determines as "yes" in step S7 and enters a state of determining whether the number has increased by the change in the region number or not (step S8).

In the case where it is determined as "yes" (that is, in the case where the user continuously traces the ring pad 121 clockwisely), the system controller 206 increases the present playback speed only by a predetermined amount, stores the increased playback speed in the ROM/RAM unit 210 (step S9), and returns to the process in step S5. In contrast, when it is determined as "no" in step S8 (that is, when the user traces the ring pad 121 continuously, counterclockwisely), the system controller 206 decreases the present playback speed only by a predetermined amount, stores the decreased playback speed in the ROM/RAM unit 210 (step S10), and returns to the process in step S5. An arbitrary reference according to which the change amount of the playback speed is determined may be used. For example, the following method may be employed. First, the reproduction speed is divided into seven levels from "−3" . . . "0" . . . "+3". The seven levels are defined as (1) "−3"=rewind playback at 3× speed, (2) "−2"=rewind playback at 2× speed, (3) "−1"=rewind playback at 1.5× speed, (4) "0"=normal playback speed, (5) "+1"=fast-forward playback at 1.5× speed, (6) "+2"=fast-forward playback at double speed, and (7) "+3"=fast-forward playback at 3× speed. According to a change in the region number, the playback speed may be adjusted by increasing/decreasing the level of the playback speed.

After that, the processes in steps S5 to S10 are repeated. As a result, the playback speed is sequentially adjusted to playback speed desired by the user. At the time point the user moves his/her finger off from the ring pad 121, the system controller 206 determines as "yes" in step S6 and returns to the main routine.

In the Case where Region Number is in the Range of "9" to "16" (Volume Adjustment)

In the case where the region number specified in step S1 lies in the range from "9" to "16", the system controller 206 shifts to a mode for volume adjustment (step S11). In the case of shifting to the mode, the system controller 206 stores the present volume level into the ROM/RAM unit 210, generates image data for displaying the volume level, and supplies the image data to the decoder 205 (step S12). As a result, the present volume level is displayed on the monitor MN. After that, in steps S13 to S15, the system controller 206 executes processes similar to the steps S6 to S8. When it is determined as "yes" in step S15, the system controller 206 increases the volume level in accordance with a change amount of the region number traced with the finger, overwrites the changed volume level in the ROM/RAM unit 210 (step S16), and returns to the process in step S12. The value of the volume level which changes at the time of one region change is arbitrary. For example, the volume level may be controlled to be changed only by "one" level for one region change, or by "two" or "three" levels for one region change. On the other hand, in the case where it is determined as "no", the system controller 206 decreases the volume level in accordance with the change amount of the region number traced with the finger, overwrites the changed volume level in the ROM/RAM unit 210 (step S17), and returns to the process of step S12. After that, by repeating the processes in steps S12 to S17, the volume adjustment is performed. At the time point the user moves his/her finger off from the ring pad 121, the system controller 206 determines as "yes" in step S13 and returns to the main routine.

In the Case where Region Number is in the Range of "17" to "24" (Movement of Title)

In the case where the region number specified in step S1 lies in the range from "17" to "24", the system controller 206 shifts to a mode for moving a title (step S18). The "title" denotes a program name of content data, and movement of a title denotes an operation of selecting content data to be reproduced. In the case where the system controller 206 shifts to the mode, the system controller 206 outputs image data for displaying a menu screen showing a list of recorded programs to the decoder 205 on the basis of the data recorded on a DVD or the like to be reproduced (step S19). Any method of displaying the menu screen may be employed. For example, it is also possible to record image data corresponding to the menu screen in a DVD or the like and display a list on the basis of the image data. A menu screen showing a list of images of first frames of content data recorded on an HD or the like may be displayed.

When a list is displayed, in steps S20 to S22, the system controller 206 executes processes similar to those of steps S6 to S8. When it is determined as "yes" in step S22, the system controller 206 moves a selected menu item in accordance with the change amount of the region number traced with the finger in a predetermined direction "a" (step S23), and returns to the process in step S19. On the other hand, when it is determined as "no", the system controller 206 moves a selected menu item in accordance with the change amount of the region number traced with the finger in a predetermined direction "b" opposite to the direction "a" (step S24), and returns to the process in step S19. The movement direction has to be properly determined according to the display format of the menu screen. For example, in the case of displaying menu items in one row and multiple columns, it is sufficient to move the selected item upward (that is, a=up) in step S23 and move the selected item downward (that is, b=down) in step S24. By repeating the processes in steps S19 to S24, a title is selected. At the time point when the user moves the finger off the ring pad 121, the system controller 206 determines as "yes" in step S19, starts playback of content data corresponding to a menu item selected at that time point (step S25), and returns to the main routine.

In the Case where Region Number is in the Range of "25" to "32" (Movement of Chapter)

In the case where the region number specified in step S1 lies in the range from "25" to "32", the system controller 206 determines whether content data is being reproduced or not (step S26). When it is determined as "no", the system controller 206 returns to the main routine. On the other hand, when it is determined as "yes", the system controller 206 shifts to a mode for moving the position of playback to another chapter (step S27). A chapter denotes data indicating a break timing of a program corresponding to content data. In the case where the system controller 206 moves to the mode, first, the system controller 206 stores a reproduction position in content data being reproduced (that is, reproduction time from start of reproduction) into the ROM/RAM unit 210, generates image data for displaying a chapter closest to the present reproduction position, and supplies the image data to the decoder 205 (step S28). As a result, the information indicative of the chapter being currently reproduced is displayed on the monitor MN. Subsequently, in steps S29 to S31, the system controller 206 executes processes similar to those in steps S6 to S8. When it is determined as "yes" in step S31, the system controller 206 makes the reproduction position in a chapter stored in the ROM/RAM unit 210 jump to a backward chapter only by a value corresponding to the change amount in the region number touched with the finger, overwrites the data indicative of the chapter to which the reproduction position is jumped into the ROM/RAM unit 210 (step S32), and returns to the process in step S28. On the contrary, when it is determined as "no" in step S31, the system controller 206 makes the reproduction position jump forward only by a value corresponding to the change amount in the region number touched with the finger from the chapter stored in the ROM/RAM unit 210, overwrites the data indicative of the chapter to which the reproduction position is jumped into the ROM/RAM unit 210 (step S33), and returns to the process in step S28.

After that, the processes in steps S28 to S33 are repeated. At the time point when the reproduction position is changed and the user moves the finger off from the ring pad 121, the system controller 206 determines as "yes" in step S29 and returns to the main routine.

As described above, the user I/F system UIS of the embodiment is a system for controlling the DVD/HD recorder DHR in accordance with a plurality of pieces of predetermined control content on the basis of an input operation of the user. The remote controller RC includes the operating unit 12 having the ring pad 121 for receiving an input operation of the user by a touch, and the controller 13 for detecting a user touch region. The system controller 206 in the DVD/HD recorder DHR detects a change in the touch region in the case where the user changes the touch position (that is, the user continuously traces the ring pad 121) while maintaining the touch state with the ring pad 121. The system controller 206 determines control content on the basis of the touch region in the ring pad 121 and performs a control of the specified control content on the basis of a control amount according to the number of regions changed at the time of the change in the touch region.

With the configuration, an object to be controlled is determined on the basis of a user touch region and, further, a control is performed with a control amount according to the number of regions continuously traced by the user. Thus, without increasing the number of buttons, both of control content and a control amount can be designated.

In the embodiment, the system controller 206 increases or decreases the control amount in accordance with the touch region change direction. Consequently, for example, in the case of performing volume adjustment, the volume adjustment can be performed by a simple input operation of continuously tracing the ring pad 121 clockwisely or counter-clockwisely. Thus, convenience of the user can be improved.

Although the case of controlling the DVD/HD recorder DHR has been described in the foregoing embodiment, an electronic device to be controlled may be any electronic device such as a television receiver, an AV (Audio Visual) amplifier, a portable DVD player, an MP3 (MPEG Audio Layer-3) player, or a car navigation system. In this case as well, the control can be performed in a manner similar to the embodiment.

In the first embodiment, the example in which the operating unit 12 of the remote controller RC is provided with a ring-shaped operating element (that is, the ring pad 121) has been described. It is sufficient for an operating element provided for the operating unit 12 to divide a region in the circumferential direction and perform an input operation. The operating element may have any shape such as triangle, quadrangle, or pentagon. In this case, it is also possible to define control content for each of the sides of the shape, and specify control content for a side touched first by the user.

Further, in the first embodiment, the case of defining four operations for each of the regions on the ring pad 121 has been described. The number of operations defined is not limited to four but may be any number.

Further, in the first embodiment, the case of adjusting the playback speed and the like has been described. The control content is not limited to the adjustment of the playback speed. Any process using control content and a control amount may be applied to any control.

Further, in the first embodiment, the total range of the ring pad 121 is divided into a plurality of regions, and a control amount is changed according to a change amount of a region touched with a finger of the user. It is also possible to calculate trace distance from the region with which the user touches first and accordingly change the control amount. In this case, it is sufficient to manage each of positions on the ring pad 121 as a coordinate value and change the control amount on the basis of a change amount of the coordinates.

Although the method of dividing the ring pad 121 to regions has been described in the foregoing embodiment, in the case where the ring pad 121 has a configuration in which a plurality of buttons each having a stroke almost zero are disposed, each of the buttons can be handled as a region.

1.3 Modifications (1) First Modification

The foregoing embodiment employs the method of transmitting a control signal indicative of the region number of a region touched by a finger of the user from the remote controller RC, specifying control content corresponding to the region number indicated by the control signal by the DVD/HD recorder DHR and, further, changing the control amount. It is also possible to specify control content and a control amount corresponding to a region touched by the user in the remote controller RC, and transmit a control signal corresponding to the control content and the control amount to the DVD/HD recorder DHR. In this case, it is sufficient to execute the processes in FIGS. 3 and 4 in the controller 13 in the remote controller RC and output a control signal corresponding to the control content in steps S9, S10, S16, S17, S23, S24, S32, and S33.

It is also possible to provide the DVD/HD recorder DHR body with the ring pad 121 as an operating unit and execute the processes of FIGS. 3 and 4 in accordance with an input operation of the user on the ring pad 121. In this case, the remote controller RC may not be provided.

(2) Second Modification

Although the method of determining a control amount only based on the number of regions continuously traced by the user is employed in the foregoing embodiment, the control amount may be determined in consideration of not only the number of regions but also the speed at the time of continuously tracing the ring pad 121. In this case, when the user traces the ring pad 121 and a region touched by a finger of the user changes, time required for a change in one region is managed in the system controller 206 in the DVD/HD recorder DHR. In the case where the tracing speed is fast and the time is within predetermined time, for example, the volume level may be changed by two or three levels at each time.

In the second modification, the control amount is determined also in consideration of speed, so that the flexibility of the control can be improved.

(3) Third Modification

The foregoing embodiment employs the method of performing a control only by a predetermined control amount each time a region touched by a finger of the user changes by one region. The control amount in the case where the region changes by one region does not have to be fixed. For example, the control amount at the time of a change by one region can be determined in consideration of the sound volume level at present.

Figure 5:
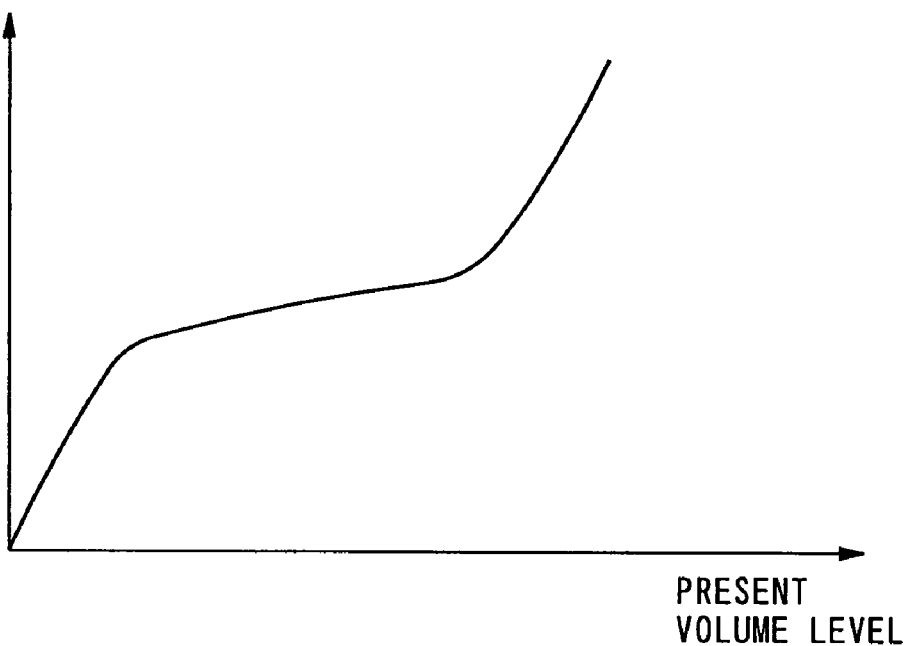
FIG. 5 is a diagram showing the relation between a change amount in volume level and a present volume level in the case where a change by one region occurs in the user I/F system UIS of a third modification.

In this case, the volume level changed at the time of a change by one region may be set for the present volume level as shown in an example of FIG. 5. When a change by one region occurs at a low volume level or high volume level, a control may be performed so that the volume level changes only by two or three levels. In the case of employing this method, according to the present volume level and the like, flexibility in the control can be increased. For example, a control can be performed so as to make fine adjustment at a predetermined volume level.

(4) Fourth Modification

In the foregoing embodiment, it is not considered to change the control content defined for each of the regions of the ring pad 121 of the remote controller RC. In contrast, in the fourth modification, the control content defined to each of the regions in the ring pad 121 is changeable.

To realize such a function, in the fourth modification, a button for switching the mode in the remote controller RC is provided for the operating unit 12 and a display made by, for example, a liquid crystal panel is provided for the remote controller RC. Each time the user selects the mode switching button, the control content defined for each of the regions in the ring pad 121 is changed. The present mode and the control content defined for each of the regions are displayed on the display. More concretely, control content as shown in FIG. 2 is assigned to each of regions in mode 1. In mode 2, control content of "frame-advance playback" is defined for the regions of Nos. "1" to "8", control content of "selection of recording year/month/day" is defined for the regions of Nos. "9" to "16", control content of "selection of recording hour" is defined for the regions of Nos. "17" to "24", and control content of "selection of recording channel" is defined for the regions of Nos. "24" to "32". According to a selected mode, the control content defined for the ring pad 121 is displayed on the display.

In this case, it is sufficient to send a control signal indicative of both of the present mode and the region number from the remote controller RC and specify control content corresponding to an input operation of the user in the DVD/HD recorder DHR on the basis of the control signal.

In the case of employing the configuration, the control content to be associated with each of the regions may be optionally changed by the user.

As described above, in the fourth modification, a plurality of modes are set in the remote controller RC and, by switching the mode, the control content defined for the ring pad 121 is changed. Consequently, the number of control content pieces which can be performed with a single ring pad increases, and the number of buttons provided for the remote controller RC can be decreased.

The invention claimed is:

1. A user interface system for controlling an electronic device in any of a plurality of pieces of predetermined control content on the basis of an input operation of the user, comprising:
    an operating device having an operation screen for accepting an input operation of the user by a touch;
    a position detecting device which detects a user touch position in the operation screen;
    a position change detecting device which detects a change in the touch position in the case where the user changes the touch position while maintaining the touch state with the operating device; and
    a control device which determines the control content on the basis of the touch position in the operation screen and, when the touch position changes, controls the electronic device with the control content on the basis of a control amount according to an amount of the change in the touch position,
    wherein in the case where the control amount is a function of the present value of the control content, the control device changes the control amount according to the change amount in such a way that a shape of graph indicative of the function becomes to a smoothly-staircase-like, and monotonously increased shape in the case where the present value is indicated by a horizontal axis, and the control amount is indicated by a vertical axis.

2. The user interface system according to claim 1, further comprising:
    a controller mounted on the electronic device; and
    a remote controller provided separately from the controller,
    wherein the remote controller comprises the operating device, the position detecting device and, further, a transmitting device which transmits position information indicative of the touch position detected by the position detecting device to the controller,
    the controller has the position change detecting device, the control device and, further, a receiving device which receives the position information transmitted from the remote controller, and
    the position change detecting device detecting a change in the touch position on the basis of the position information.

3. The user interface system according to claim 1, further comprising:
    a controller mounted on the electronic device; and
    a remote controller provided separately from the controller,
    wherein the remote controller comprises the operating device, the position detecting device, the position change detecting device and, further, a control information transmitting device which transmits control information corresponding to
    (a) the touch position detected by the position detecting device, and
    (b) a change in the touch position detected by the position change detecting device,
    the controller has the control device and, further, a receiving device which receives the control signal, and
    the control device controls the electronic device on the basis of the control information.

4. The user interface system according to claim 1, wherein the operating device has a ring-shaped operating element.

5. The user interface system according to claim 1, wherein the operating device has the operation screen divided in a plurality of regions,
    the position detecting device detects the region touched by the user,
    the position change detecting device detects a change in the touch region when the user touch region changes while maintaining a touch state, and
    the control means determines the control content on the basis of the touched region in the operating device and, when the touch region changes, controls the electronic device with the control content on the basis of a control amount according to the number of regions changed.

6. The user interface system according to claim 1, wherein the control device changes the control amount so as to be increased or decreased in accordance with a change direction of the touch position.

7. The user interface system according to claim 1, wherein the control device further changes the control amount so as to be increased or decreased in accordance with a change speed of the touch position.

8. The user interface system according to claim 1, wherein the control device has a plurality of modes in each of which the control content and the control amount are determined in advance, and changes the control content and the control amount in accordance with the mode.

9. The user interface system according to claim 1, wherein for a first range of the present value, a second range to which the present value bigger than the first range belongs and, a third range to which the present value bigger than the second range belongs, the control device changes the control amount in such a way that the change of the control amount in the case where the present value belongs to the second range is gentler than the change of the control amount in the case where the present value belongs to the first range, and the change of the control amount in the case where the present value belongs to the third range is steeper than the change of the control amount in the case where the present value belongs to the second range.

10. A user interface system for outputting a control signal for controlling an electronic device in any of a plurality of pieces of predetermined control content on the basis of an input operation of the user, comprising:
    an operating device having an operation screen for accepting an input operation of the user by a touch;
    a position detecting device which detects a user touch position in the operation screen;

a position change detecting device which detects a change in the touch position in the case where the user changes the touch position while maintaining the touch state with the operating device; and an output device which outputs a control signal corresponding to a control amount based on the touch position, and a change amount of the change in the touch position detected by the position change detecting device, wherein in the case where the control amount is a function of the present value of the control content, the output device changes the control amount according to the change amount in such a way that a shape of graph indicative of the function becomes to a smoothly-staircase-like, and monotonously increased shape in the case where the present value is indicated by a horizontal axis, and the control amount is indicated by a vertical axis, and the output device outputs a control signal corresponding to the changed control amount.

11. The user interface system according to claim 10, wherein for a first range of the present value, a second range to which the present value bigger than the first range belongs and, a third range to which the present value bigger than the second range belongs, the output device changes the control amount in such a way that the change of the control amount in the case where the present value belongs to the second range is gentler than the change of the control amount in the case where the present value belongs to the first range, and the change of the control amount in the case where the present value belongs to the third range is steeper than the change of the control amount in the case where the present value belongs to the second range.

12. An electronic device controlling method of controlling an electronic device in any of a plurality of pieces of predetermined control content on the basis of an input operation of the user, comprising:

a first process of detecting a touch position of a user in an operating element having an operation screen for accepting an input operation of the user by a touch;

a second process of detecting a change in the touch position in the case where the user changes the touch position while maintaining the touch state with the operating element; and a third process of determining the control content on the basis of the touch position in the operating element and, when the touch position changes, controlling the electronic device with the control content on the basis of a control amount according to an amount of the change in the touch position, wherein the third process is a process of, in the case where the control amount is a function of the present value of the control content, changing the control amount according to the change amount in such a way that a shape of graph indicative of the function becomes to a smoothly-staircase-like, and monotonously increased shape in the case where the present value is indicated by a horizontal axis, and the control amount is indicated by a vertical axis.

13. The electronic device controlling method according to claim 12, wherein for a first range of the present value, a second range to which the present value bigger than the first range belongs and, a third range to which the present value bigger than the second range belongs, the third process changing the control amount in such a way that the change of the control amount in the case where the present value belongs to the second range is gentler than the change of the control amount in the case where the present value belongs to the first range, and the change of the control amount in the case where the present value belongs to the third range is steeper than the change of the control amount in the case where the present value belongs to the second range.

\* \* \* \* \*